J. W. VINEYARD.
Breast-Yoke Connection.
No. 214,475. Patented April 15, 1879.
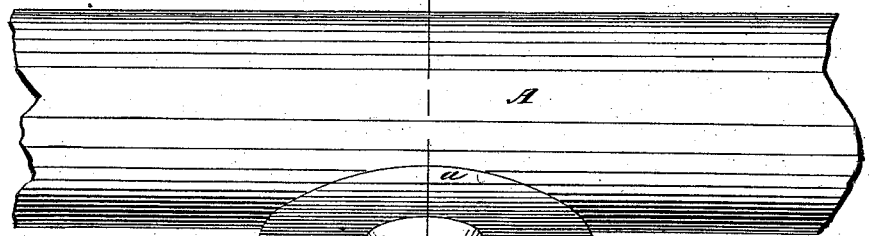
Fig. 1.
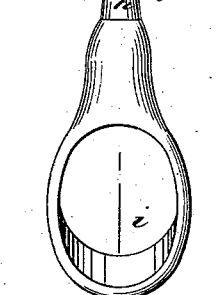
Fig. 2.
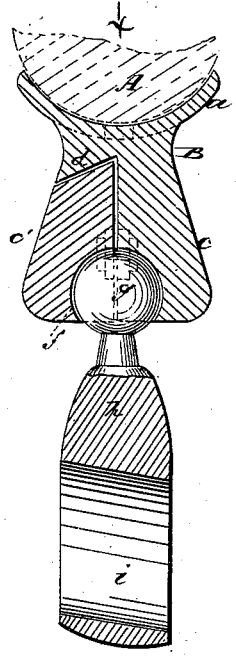
WITNESSES:
Francis McArdle
C. Sedgwick
INVENTOR:
J. W. Vineyard
BY
ATTORNEYS.

UNITED STATES PATENT OFFICE.

JOHN W. VINEYARD, OF GALLATIN, TENNESSEE.

IMPROVEMENT IN BREAST-YOKE CONNECTIONS.

Specification forming part of Letters Patent No. 214,475, dated April 15, 1879; application filed January 2, 1879.

*To all whom it may concern:*

Be it known that I, JOHN W. VINEYARD, of Gallatin, in the county of Sumner and State of Tennessee, have invented a new and Improved Breast-Yoke Connection, of which the following is a specification.

This invention relates to an improved device for connecting the breast-yoke with the pole or tongue of a wagon, the object whereof is to supply a strong and durable connection, presenting a neat appearance, and adapting itself readily to the various movements of the tongue.

It consists of a metal socket-piece for attaching to the neck-yoke, in which is socketed a ball on the end of a metal loop or eye for supporting the tongue, whereby a metal ball-and-socket connection is obtained.

In the accompanying drawings, Figure 1 is a front view of my improvement applied to a neck-yoke, and Fig. 2 is a section of the same on line $x\ x$.

Similar letters of reference indicate corresponding parts.

Referring to the drawings, A represents a neck-yoke. B is the socket-piece. The end opposite the socket is provided with a flange, $a$, concave on its upper side and fitted to the neck-yoke, to which it is secured by bolts $b\ b$. Below the flange the piece B is divided into two parts, $c\ c'$, $c$ being solid or in one piece, while $c'$ is cut out through the middle of the socket-piece, the end dovetailing with piece $c$, as shown at $d$; and the contiguous edges of the parts $c\ c'$ are provided with projecting ears or flanges $e\ e$, with holes, through which bolts, screws, or rivets are passed to connect the parts $c\ c'$ together. At the end of piece B, so as to be half in $c$ and half in $c'$, is made a spherical socket, $f$, and in this socket is confined the ball $g$ in shank $h$, on which is formed the loop $i$ for supporting the pole of the wagon or carriage.

The operation of the device is apparent.

The ball-and-socket connection gives perfect freedom of movement to the tongue. At the same time it is stronger and more durable than the leather connection usually employed, and can be made to present a much neater appearance.

Making the socket part B into two parts, $c\ c'$, enables the ball piece to be taken out when broken, and another replaced without trouble.

Having thus described my invention, I claim as new and desire to secure by Letters Patent—

1. In an improved breast-yoke connection, the combination, with the divided socket-piece B, adapted to be attached to the yoke, of a metal loop, $i$, having shank $h$ and ball $g$, the two forming a ball-and-socket connection, substantially as shown and described.

2. The metal piece B, having flange $a$, and provided with the socket-pieces $c\ c'$, having connecting-flanges $e\ e$, in combination with loop $i$, having a ball confined within the socket, as shown, and for the purpose described.

JOHN WILLIAM VINEYARD.

Witnesses:
J. H. McLAREN,
B. W. VINEYARD.